No. 713,777. Patented Nov. 18, 1902.
O. LEDOVSKY.
DISCONNECTIBLE PIPE COUPLING.
(Application filed Jan. 18, 1902.)
(No Model.) 2 Sheets—Sheet 2.
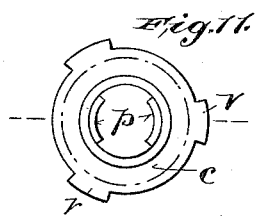
Fig. 11.
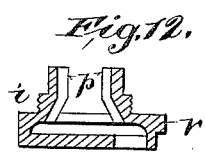
Fig. 12.
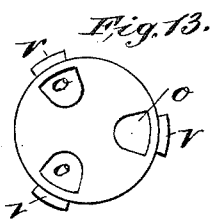
Fig. 13.
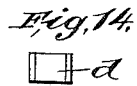
Fig. 14.
Fig. 15.
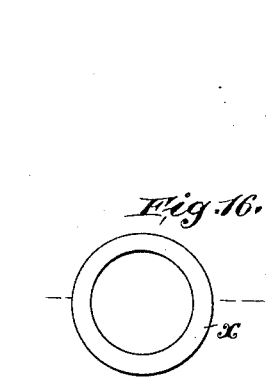
Fig. 16.
Fig. 17.
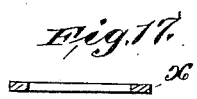
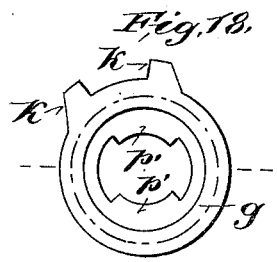
Fig. 18.
Fig. 19.
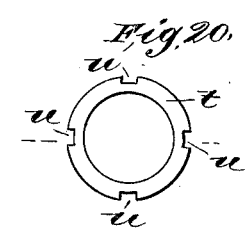
Fig. 20.
Fig. 21.
Fig. 22.
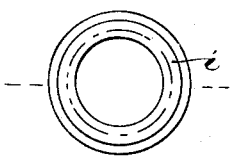
Fig. 23.
Witnesses.
C. W. Benjamins
H. van Heerenbrinck
Inventor.
Onesim Ledovsky
by Alexanders & Co
Attys

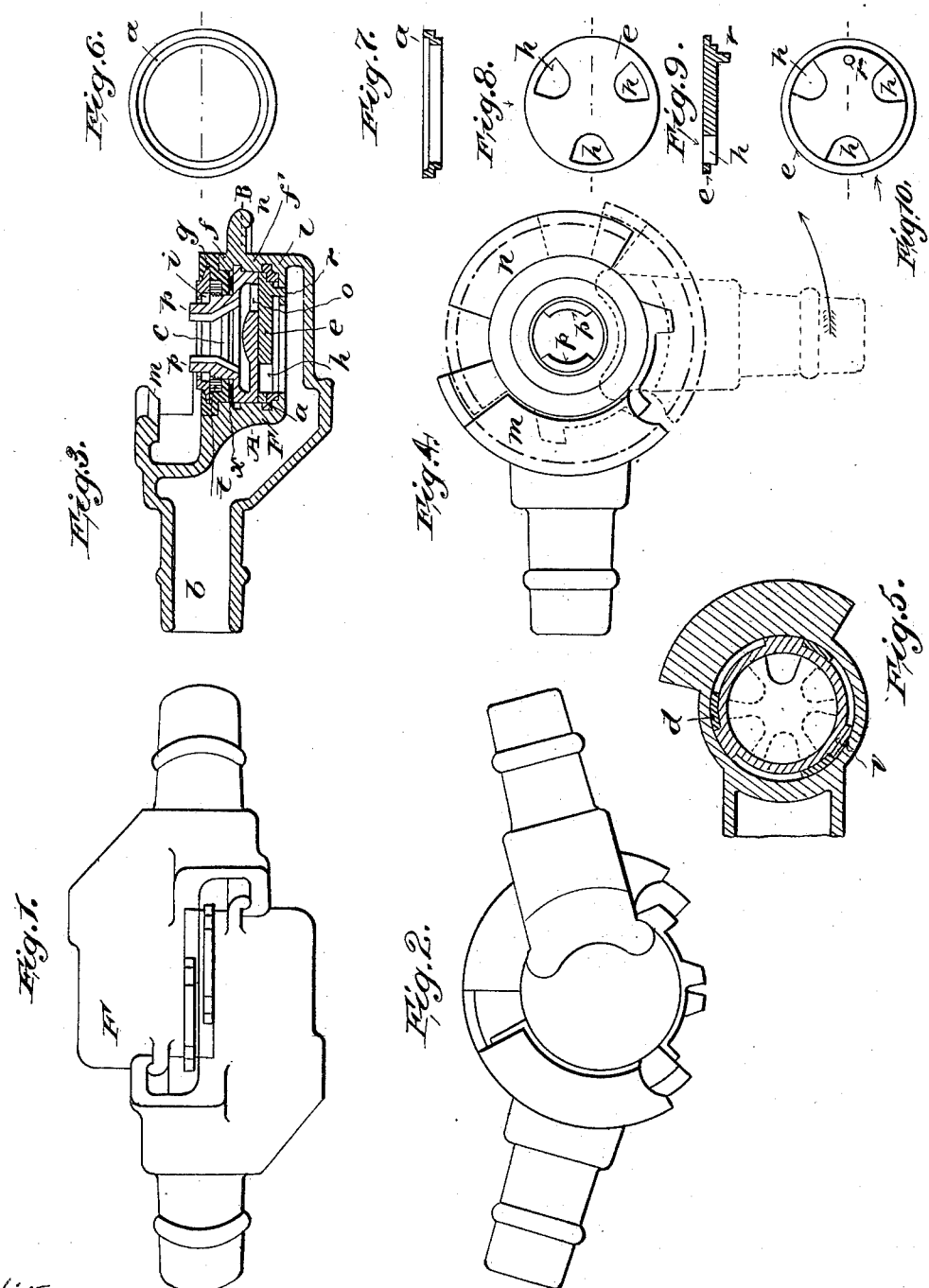

UNITED STATES PATENT OFFICE.

ONESIM LEDOVSKY, OF ST. PETERSBURG, RUSSIA, ASSIGNOR TO COMPANY FOR THE WORKING OF THE COUPLING VALVE SYSTEM LEDOVSKY, OF ST. PETERSBURG, RUSSIA.

DISCONNECTIBLE PIPE-COUPLING.

SPECIFICATION forming part of Letters Patent No. 713,777, dated November 18, 1902.

Application filed January 18, 1902. Serial No. 90,265. (No model.)

*To all whom it may concern:*

Be it known that I, ONESIM LEDOVSKY, a subject of the Emperor of Russia, and a resident of Nixolayeffsxaya street, 57, St. Petersburg, Russia, have invented certain new and useful Improvements in Disconnectible Pipe-Couplings, of which the following is a specification.

The disconnectible pipe-coupling which forms the object of the present invention is for the purpose of coupling sections of flexible pipes for gases, liquids, or other fluids under pressure. The arrangement is such that when two similar couplings (with one of which each of the two sections of the pipe to be connected is provided) are coupled up uninterrupted communication is established between these sections; but as soon as the two couplings are disconnected purposely or by accident the valves which they contain are automatically closed and prevent all communication between the pipe and the surrounding atmosphere.

In the accompanying drawings, Figure 1 is a side elevation of two pipe-couplings coupled up. Fig. 2 is a plan view of the same. Fig. 3 is a vertical section on the axis of one of the pipe-couplings. Fig. 4 is a plan view of the same. Fig. 5 is a horizontal section on the line A B of Fig. 3. Figs. 6 to 23 are views showing the parts of the coupling separately.

As shown in Fig. 3, the pipe-coupling consists of a box or shell F, provided with circular projecting flanges $m$ and $n$ in one piece with the tube $b$, to which the end of the pipe to be coupled up is fixed. A rubber washer $a$, Figs. 6 and 7, rests upon an annular shoulder with which the lower portion of the cylindrical chamber of the box F is provided. The outer edge of the washer is lodged in a circular groove formed by the annular shoulders $l$ and $f'$. A metal disk $e$, Figs. 8, 9, and 10, provided with three apertures $h$, arranged at an angle of one hundred and twenty degrees to each other, rests upon the said rubber washer. The disk is provided at its lower face with a projection, which penetrates into a hole formed in a flange on the lower portion of the box F. The projection $r$ prevents any angular movement of the disk $e$. Upon the disk $e$ rests a valve $c$, Figs. 11, 12, and 13, whose lower face is adjusted tight to the upper face of the disk $e$ and which is provided upon its periphery with three circular projections $v$, which slide in a circular groove formed by the two annular shoulders $f$ and $f'$ in the box F.

In order to allow the valve $c$ to be placed into the box F, the annular shoulder $f$ is provided with three notches corresponding to the three projections $v$ in the valve. The bottom of the valve is provided with three apertures $o$, arranged at an angle of one hundred and twenty degrees to each other, which correspond with the apertures $h$ in the disk $e$. When the valve $c$ has been introduced into the box F, it is rotated thirty degrees, which causes its projections $v$ to become engaged with the shoulder $f$, whereupon keys $d$, Figs. 14 and 15, are placed in the notches formed in the said shoulder $f$, as shown in Fig. 5.

The lower end of each key $d$ rests upon the shoulder $f'$, the upper end being on a level with the upper face of the shoulder $f$. A metal ring $g$, Figs. 18 and 19, bears against the upper face of the shoulder $f$ and prevents the keys $d$ from passing out of the notches. The ring $g$ fits onto the projections $p\,p$ on the valve—that is to say, the projections $p'\,p'$ on the ring are lodged in the notches or spaces between the projections $p$ on the valve in such a manner that this latter on rotation draws with it the ring.

The ring $g$ is fixed to the valve $c$ by a nut $t$, Figs. 20 and 21, screwed onto the screw-threaded portion $s$ on the valve. The nut is provided with four notches $u$ for the passage of a key or other instrument for tightening up the nut.

A rubber washer $x$, Figs. 16 and 17 is placed between the valve $c$ and the ring $g$, thus forming a tight joint.

The ring $g$ is provided with an inner groove, in which a rubber washer $i$, Figs. 22 and 23, is lodged, serving, as will be seen later, to form a hermetically-tight joint when the coupling is coupled up. The ring $g$ is provided with teeth K K, serving to open the coupling described when it is desired to couple it with a coupling of another system—for example, that of Westinghouse.

When the couplings are uncoupled, the apertures $h$ and $o$ are at an angle of sixty degrees one to the other—that is to say, they do not coincide. The edges of the washer $a$ press against the shoulder $f'$ and against the disk $e$, thus insuring the tightness of the joint.

The upper portion of the valve $c$ is provided, as has already been stated, with two vertical projections or teeth $p\,p$, each of which extends a quarter of a circle.

In order that the couplings may be coupled together, they are placed one against the other at right angles, as shown in Fig. 4, in such a manner that the teeth $p$ on one valve pass into spaces between the teeth on the other. One of the couplings is then rotated with respect to the other in the direction shown by the arrow in Fig. 4 until the flanges $m$ of both couplings abut one against the other—that is to say, that the two couplings come into the position indicated in Fig. 2, which corresponds to a relative angular displacement of the parts of one hundred and twenty degrees. As during this displacement the teeth $p$ on the two valves $c$ prevent the latter from rotating with respect to one another and as the angle of displacement of the box F with respect to the valve is limited by the keys $d$ to sixty degrees, it results that the two boxes F will rotate sixty degrees $\left(\dfrac{120°}{2}\right)$ with respect to the valves. The apertures $o$ and $h$ will then be opposite each other and direct communication will be established between the pipes of the two apparatus through the hollow valves $c$. Further, the relative displacement of the two couplings will cause the flange $n$ of the one to slide under the flange $m$ of the other, and vice versa, thus forming a clamp which prevents the couplings from being displaced in the direction of the common axis of the valves.

The tightness of the joints is insured by the rubber washers $i$, the edges of which are forced by the inside pressure both the one against the other and against the rings $g$.

To uncouple the two couplings, it is merely necessary to turn one with respect to the other in the reverse direction one hundred and twenty degrees—that is to say, to return them to the position shown in Fig. 4. It is evident that this displacement will close the apertures $o$ and $h$ before the flanges $m$ and $n$ have been uncoupled.

I claim as my invention—

A disconnectible pipe-coupling for coupling sections of flexible pipes consisting of: a cylindrical box F provided with two outer circular flanges $m\,n$, a pipe $b$, to which is secured the flexible pipe, integral therewith, a washer $a$ of rubber or other flexible elastic material, lodged in a groove in the lower portion of the box F, a stationary metal disk $e$ resting upon the said washer and provided with apertures $h$ arranged at an angle of one hundred and twenty degrees with respect to each other, a hollow rotating valve $c$ having apertures in its flat lower end, said valve forming a tight joint with the above-mentioned disk and provided with lateral circular projections $v$ and with upward projections or teeth $p$, keys $d$, limiting the angular movement of the valve, fitting in notches on the box F, and ring $g$ immovably clamped with the valve $c$ and serving to hold said keys in place, said ring having projections K, K, substantially as described.

In witness whereof I have hereunto set my hand in presence of two witnesses.

ONESIM LEDOVSKY.

Witnesses:
N. TSCHEKALOFF,
J. BLAU.